Patented July 2, 1946

2,403,112

UNITED STATES PATENT OFFICE 2,403,112

METHOD OF PREPARING MOLDED COMPOSITIONS FROM UNSATURATED ESTERS

Irving E. Muskat, Akron, Ohio, assignor to Pittsburgh Plate Glass Company, Pittsburgh, Pa., a corporation of Pennsylvania No Drawing. Application July 30, 1941, Serial No. 404,741

6 Claims. (Cl. 260—78)

This invention relates to the polymerization of organic compounds which contain two or more polymerizable unsaturated groups which are preferably unconjugated with respect to carbon and is particularly related to the polymerization of oxygen compounds such as esters, amides, ethers, etc. Such compounds when polymerized normally form substantially infusible polymers in their final stage of polymerization. Due to their substantial infusibility, they cannot be molded or shaped to any appreciable degree after they are finally cured and accordingly, these compounds are usually cast polymerized when products having specific shapes are desired. Careful operation is required in such a process and frequently, it is found that the production of products of special shape are difficult to cast and that products containing bubbles and cracks are obtained.

In accordance with the present invention, it has been found that these difficulties may be avoided and that shaped products may be secured by shaping an intermediate polymer and curing the shaped polymer. In accordance with this process, a compound containing at least two polymerizable unsaturated groups may be polymerized to form a gel which is more fully described hereinafter. This gel is then disintegrated to form a suitable molding composition and the composition is shaped to final form and further polymerized. Preferably, the disintegrated gel, which may be in the form of a powder, is blended, fluxed, or otherwise treated to cause the particles thereof to knit together whereby a unitary structure is secured.

The polymerization of the materials herein contemplated appears to proceed through a plurality of stages. When polymerization is first initiated, the monomer thickens to a viscous syrup which is probably a solution of a fusible polymer dissolved or dispersed in the monomer. This fusible polymer is generally soluble in many organic solvents. As polymerization proceeds further, a solid or semi-solid gel is formed. This product probably comprises a mixture of monomer and polymer and possesses many of the following characteristics: at least a portion of this gel is found to be substantially insoluble in the common organic solvents such as xylene or acetone and merely swells or remains unaffected when the gel is subjected to the action of such solvents. Generally, the polymer in the gel comprises a mixture of soluble and insoluble polymers, and the two may be separated by extraction with solvents. In most cases, the quantity of insoluble material in the gel is large, often being about 20 to 85 percent.

Ordinarily, the gels do not possess substantial rigidity and generally, a flat sheet thereof may be bent or curved to a substantial degree without fracture. For example, ethylene glycol bis (methallyl carbonate) may be polymerized to form a gel ⅛ in. in thickness, 12 in. long and 2 in. wide, which may be lapped upon itself to form a cylindrical section. In some cases, however, the gel may possess considerable stiffness and be incapable of being bent in this manner at ordinary temperatures. This may be particularly true of thick sections thereof. The gels are comparatively weak, do not possess a high tensile strength and crumble and tear readily. Often they have a physical structure resembling that of a gelatin gel.

These polymerization products may be further polymerized to form hard, tough polymers which are considerably less brittle than glass and more resistant to shattering. Such polymers, which may be termed "glassy" or "rigid" polymers, have high tensile strength and have many of the properties characteristic of other organic glasses. Generally, these products possess substantial rigidity and bend only under comparatively high loads, although in some cases pliable polymers may be prepared. The glass polymer generally possesses considerable elasticity. Thus, when it is deformed under a load, it generally tends to assume its original shape when the load is released. These polymers are largely insoluble.

The invention is particularly related to the treatment of polyesters of polybasic acids containing at least two unsaturated groups which are unconjugated with each other through carbon. Thus, the invention may be applied to the unsaturated alcohol polyesters of polybasic acids such as the esters of oxalic, maleic, adipic, malonic, succinic, itaconic, citric, tartaric, fumaric, phthalic, sulphuric, carbonic, silicic, phosphoric, or titanic acids or other acids such as diglycolic or dilactic acid, etc. and the unsaturated alcohols containing up to 10 carbon atoms, such as allyl, vinyl, methallyl, β-ethyallyl, crotyl, isocrotyl, 2-chloroallyl, methyl vinyl carbinyl, isopropenyl, isobutenyl, cinnamyl, butadienyl, propargyl, or tiglyl alcohol, or isopropyl ethynyl carbinol, or β-methyl ethynyl carbinol. Mixed esters such as vinyl-allyl, vinyl-crotyl, vinyl-methallyl, methallyl-allyl esters may also be subjected to treatment. Likewise, the invention may be applied to treatment of the esters formed by reaction of a polyhydric compound such as ethylene glycol, propylene glycol, or butylene glycol, or the corresponding polyglycols, trimethylene glycol, hexamethylene glycol, glycerol, methyl glycerol, resorcinol, hydroquinone, phthalyl alcohol, polyvinyl alcohol, hydrated cellulose, soda cellulose, etc., with haloformates of the above unsaturated alcohols such as allyl or methallyl chloroformates or acid esters of polybasic acids and unsaturated alcohols such as allyl, methallyl, or crotyl acid oxalate, acid phthalate, acid maleate, acid succinate and acid adipate. These compounds are described and claimed in application Serial No. 361,280, filed October 15, 1940 by Irving E. Muskat and Franklin Strain. Other useful polymerizable compounds are the esters of hydroxy acids esterified with unsaturated alcohols, including vinyl, allyl, or methallyl lactate, glycolate, or salicylate, and esters of polybasic acids which are partially esterified with unsaturated alcohol, such as allyl, methallyl, crotyl or other chloroformate, allyl, methallyl, or other acid phthalate, acid maleate or acid succinate. These compounds are described and claimed in application Serial No. 392,100, filed May 6, 1941 by Irving E. Muskat and Franklin Strain, now U. S. Patent No. 2,387,931.

In order to obtain products of maximum hardness, it is desirable to utilize compounds wherein the number of carbon atoms in the monomeric molecule is not excessive. Thus, allyl esters polymerize to form substantially harder products than the polymer produced by direct polymerization of the corresponding oleyl esters. Other things being equal, the trend toward softer products increases as the number of carbon atoms per unsaturated group increases. The trend toward softer products with increase in carbon atoms may be minimized by increasing the number of polymerizable groups in the composition. In general, it is preferred to make use of agents wherein the ratio of the number of carbon atoms to the number of polymerizable unsaturated groups does not exceed 15.

The polymerization of these products to the gel may be accomplished by any convenient means. Generally, the polymerization is conducted by means of heat and/or light such as ultra-violet light and in the presence of an oxygen catalyst such as oxygen, ozone, peroxides, such as acetone peroxide, lauryl peroxide, benzoyl peroxide, etc. In accordance with one suitable method, the compound to be polymerized is placed in a mold, either in monomeric form or as a viscous syrupy polymer, and is further polymerized to the gel state.

It has been found that air sometimes inhibits the peroxide catalyst, thus the polymerization is preferably conducted in a mold from which the air is excluded. This may be done by conducting the polymerization in a closed mold and filling the mold substantially completely with unpolymerized material. Where polymerization is conducted in a horizontal mold a glass plate or other mold surface may be floated upon the polymerizable material. If desired, however, polymerization may be conducted in vertical molds, preferably with exclusion of air or oxygen. Preferably, the gels are formed in sheets which are not unduly thick in order to insure substantial uniformity throughout the gel. Generally, these sheets are about one-fourth to one-half inch in thickness.

In order to secure a gel which is capable of being molded and further polymerized, care should be taken to secure a product which has been polymerized to the proper degree. Where the product has been insufficiently polymerized, cracked products are often produced in subsequent molding operations, due in all probability, to the shrinkage which occurs in the final polymerization. On the other hand, a product which is too greatly polymerized often fails to knit together. In general, the degree of polymerization is ascertained by determining the percentage insolubility of the polymer. This may be done by extracting portions of the polymer with a solvent for monomer and soluble polymer such as acetone, for several hours and determining the percentage which remains undissolved. The permissible percentage of insolubility is capable of considerable variation in accordance with the temperature and pressure of the molding process and whether or not fillers or reenforcing pigments are utilized. For most purposes the insoluble polymer content should not be below about 20 percent and since a substantial portion of soluble polymerizable material should be present the insoluble polymer content should not exceed about 85 percent by weight based upon the weight of monomer incorporated or upon the weight of the polymerizable gel after deducting the weight of any filler or reenforcing agent which may have been incorporated. Where the clear unfilled gel is molded, too low insoluble polymer content may produce cracked moldings or may be too fluid for suitable molding. Accordingly, it is generally found desirable to utilize a gel containing at least about 40 percent by weight of insoluble polymer and gels containing about 50 to 75 percent insoluble polymer are found to be most satisfactory when molding at pressures up to 20,000 lbs. per square inch. On the other hand, products containing 80 or 85 percent insoluble polymer may be molded at pressures of about 50,000 lbs. per square inch or above. In general, it may be stated that for a given pressure as the insoluble content of the gel undergoing molding is increased, the tendency toward production of a product having surface imperfections and impaired gloss is increased and vice versa. This factor may be compensated for to some degree by increasing the molding pressure in treating products of high insolubility.

When reenforcing agents or fillers are incorporated the concentration of insoluble polymer is generally decreased. Thus, compositions containing 20 percent gel based upon the weight of monomer used which are reenforced with cellulose fiber, magnesium carbonate, etc., may be molded and further polymerized with facility. On the other hand, gels containing 80 to 85 percent insoluble polymer and a substantial quantity of filler are often exceedingly difficult to mold and, in general, the insoluble polymer concentration of the gel preferably should not exceed 60 to 70 percent in such cases and usually the sum of the filler and the insoluble polymer should be about 50 to 75 percent by weight of the composition.

The gels thus obtained are broken up by suitable means to form a molding powder which, in general, is in the form of a comparatively fine powder. The product thus obtained has been found to be an especially effective molding composition which may be molded under heat and/or pressure. It is capable of being molded or shaped at low temperatures and at low pressures due to its exceptional plasticity. Thus, the product is capable of being subjected to extrusion or transfer molding operations without requirement of the extreme pressures normally required in the molding of other thermosetting resins.

Opaque, transparent, or translucent materials may be secured by this means. Since these products are dimensionally stable at elevated temperatures, they may be removed from the mold without cooling the mold. In order to assist the polymerization, polymerization catalysts may be incorporated. In most cases, however, it has been found desirable to conduct polymerization to the gel state under conditions such that a substantial quantity of the peroxide (50 percent or more) initially incorporated is retained by the gel. This may be done by maintaining temperature of polymerization below the temperature at which the peroxide spontaneously decomposes. The temperature and pressure of molding of the broken up gel is capable of comparatively wide variation. In general, the temperature and pressure should be such as to cause the discrete particles of the gel to knit together before polymerization is complete, whereby a strong substantially homogeneous product is secured. This blended article may then be further polymerized as described. Occasionally, it may be found that the gel is so fluid that it exudes from the mold. This may be avoided, if desired, by preliminarily partially polymerizing the gel by heat or light prior to molding.

The temperature required for polymerization of the compounds herein contemplated in order to produce the gel and also, to further cure the gel is dependent upon the nature of the compound being polymerized and especially upon the catalyst used. In general, it may be stated that the temperature should not exceed the temperature at which the peroxide catalyst decomposes spontaneously and should be maintained sufficiently below this temperature to insure the presence of catalyst in the gel until polymerization proceeds to a desired degree. Using benzoyl peroxide as a catalyst, polymerization to the gel state at a temperature of 50 to 90° C. is found to be preferable, for the preparation of the gel. The gel may then be further polymerized or cured at a temperature of, for example, 100 to 125° C. or above. If residual catalyst remains, it may be substantially completely destroyed by raising the temperature to a sufficiently high level, for example, 150° C. With catalysts such as acetone peroxide, the permissible temperature limitations, particularly in the final stages of cure may be considerably higher. On the other hand, certain catalysts decompose too rapidly at the specified temperatures and accordingly, lower temperatures are required.

In many cases it has been found desirable to incorporate fillers or tinting or reenforcing pigments into the gel. While this may be done by milling or mixing the gel with the filler or pigment, it is found that more uniform products may be obtained by incorporating the filler or pigment into the monomer or partially polymerized syrup and polymerizing to form the gel. Materials such as finely divided barium, calcium, or magnesium silicate or carbonate, finely divided glass or resins such as polymerized methyl methacrylate, polyvinyl acetate, polyvinyl chloride, polystyrene, polymerized diallyl phthalate, etc., zinc oxide, lamp black or titanium dioxide, particularly pigments having a particle size below one micron or other fillers such as asbestos, alpha cellulose, wood fiber, etc.

Plasticizers or lubricants or other improving agents may be incorporated in order to assist the moldability of the gel. For example, diethylene glycol bis(butyl carbonate), tiethylene glycol bis(butyl carbonate), tricresyl phosphate, allyl or methallyl alcohol, castor oil, coconut oil, soaps, such as lead stearate, lead oleate, and sodium oleate, or high melting point waxes, may be introduced. These materials may be added to the gel and are found to be particularly desirable in assisting molding of gels, having high insoluble polymer content. If desired, the plasticizer or lubricant may be incorporated in the monomer or syrupy polymer prior to formation of the gel. By this means it is often possible to secure a more intimate dispersion of the plasticizer in the gel and thereby to improve the molding characteristics thereof.

Polymerizable materials including both polyfunctional and monofunctional compounds such as methyl, ethyl, or propyl acrylate, methacrylate, or chloroacrylate, vinyl chloride, vinyl acetate, styrene, divinyl benzene, butadiene, acrylonitrile, chlorobutadiene, unsaturated alcohol esters of unsaturated acids such as vinyl, allyl, methallyl, 2-chloroallyl, or other esters of coumarinic, crotonic, acrylic, or alpha-substituted acrylic acid esters or the corresponding unsaturated alcohol esters of polybasic acids such as diallyl phthalate, maleate, fumarate, succinate, adipate, etc. may be incorporated in the gel. Often it is desired to add actively polymerizable polyfunctional materials such as glycol dimethacrylate, glycol diacrylate, glycol dichloroacrylate, or the corresponding esters of other polyhydric alcohols such as diethylene glycol, triethylene glycol, propylene glycol, glycerol, methyl glycerol, etc. or the vinyl, allyl or methallyl or similar unsaturated esters of acrylic, methacrylic or other unsaturated acids in order to promote polymerization of the gel. These materials may also be added to the monomer or syrupy polymer prior to polymerization to the gel state. Where a monofunctional composition is mixed with a polyfunctional compound it is preferred that the concentration of polyfunctional compound (compound containing at least two polymerizable groups) comprises at least 50 percent of the polymerizable components of the composition.

In accordance with a further method, similar gels may be prepared by polymerizing the compounds in emulsion form, such as an aqueous emulsion. By this means a molding composition made up of discrete particles may be secured directly. This product may be molded as herein described. Likewise, soluble fusible polymers as prepared in accordance with the methods described in United States Patent 2,273,891 filed by myself jointly with Maxwell A. Pollack and Franklin Strain on February 18, 1939, may be further polymerized to form an insoluble fusible polymer which may be polymerized as herein described. The following examples are illustrative of the invention.

*Example 1*

Forty grams (5 percent) of benzyl peroxide was dissolved in 800 grms. of substantially pure monomeric ethylene glycol bis (allyl carbonate). The mixture was filtered and then thickened to double its original viscosity by heating at 70° C. for 60 minutes under an atmosphere of $CO_2$. The thickened monomer contained 4.6% by weight of benzoyl peroxide by analysis using potassium iodide. It was placed in a shallow pan, which it filled to a depth of ¼ inch, covered with a pane of glass supported in contact with the top surface of the thickened monomer and heated in an oven at 65° C. for 577 minutes. The resulting gel was a stiff, fairly tough material of which 74.2% by weight was insoluble in acetone. The gel contains 3.3% of benzoyl peroxide or its oxidizing equivalent. This product was pulverized to give a molding powder. A 10 gram charge of this molded in a positive mold for 2¼ inch discs for 5 minutes at 125° C. under 5000 pounds per square inch gave a well knit, translucent product which had a flexural strength of 11,700 pounds per square inch and a modulus of elasticity in flexure of $4.9 \times 10^5$ pounds per square inch. It was apparent that this process was sufficient to cause fusion or blending of the particles of the powder in view of the translucency of the product.

Example II

Thirty grams (3%) of benzoyl peroxide was dissolved in 1000 g. of substantially pure monomeric ethylene glycol bis (allyl carbonate). The mixture was filtered and then thickened to double its original viscosity by heating at 70° C. for 61 minutes under an atmosphere of $CO_2$. The thickened monomer was heated in a thin layer under a contact cover glass (as in Example I) for 424 minutes at 70° C. to yield a gel that was 72.8% insoluble in acetone, contained 1.6% of benzoyl peroxide or its oxidizing equivalent, and had a density of 1.288 gm. per cc. at 25° C. This material was pulverized and mixed with 10% of its weight of monomeric glycol dimethacrylate. This mixture was molded for 10 minutes at 105° C. under 5000 pounds per square inch pressure and a hard, rigid product somewhat superior in clarity to that of Example I was obtained.

Example III

Two grams (5%) of benzoyl peroxide was dissolved in 40 g. of substantially pure monomeric diethylene glycol bis (methallyl carbonate). The solution was filtered and thickened to five times its original viscosity by heating for 83 minutes at 70° C. in an atmosphere of $CO_2$. The thickened monomer was heated in a thin layer protected from the air as in Example I for 139 minutes in an oven at 70° C. to produce a soft, flexible gel containing 41.6% of acetone insoluble matter, 3.3% of benzoyl peroxide or its oxidizing equivalent, and having a density of 1.177 gm./cc. at 25° C. This gel was pulverized and molded at 105° C. for 15 minutes under 5000 pounds per square inch to yield a clear, flexible, well knit product.

Example IV

Twelve and one-half grams (5%) of benzoyl peroxide was dissolved in 250 gm. of distilled, colorless, monomeric allyl phthalate. This was filtered and thickened to five times its original viscosity by heating for 148 minutes at 70° C. in an atmosphere of $CO_2$. The thickened monomer was gelled as described in Example I, by heating for 366 minutes in an oven at 70° C. The product had a density of 1.207 gm./cc. at 25° C., was 48.6% insoluble in acetone, and contained 3.1% of benzoyl peroxide or its oxidizing equivalent. It was pulverized and then molded for 5 minutes under 5000 pounds per square inch to give a sound, strong, rigid, well knit, translucent product.

Example V

Monomeric ethylene glycol bis (allyl carbonate), to which five percent its weight of benzoyl peroxide had been added, was thickened to double its original viscosity in the manner described in Example I, 850 g. of this thickened monomer was mixed with 150 g. of magnesium carbonate pigment in a pebble mill for 18 hours to make a white paste. This was placed in an 18"×13" enamel pan and covered with a pane of glass supported in contact with the top surface of the paste. After heating in this way for 136 minutes in an oven at 70° C. the cover glass was pried off to reveal a soft, flexible, white, translucent gel. This product, heated without the cover glass for an additional 264 minutes in an oven at 70° C., was found to contain 62.1% of matter insoluble in acetone and 2.8% of benzoyl peroxide or its oxidizing equivalent. Thus, the content of insoluble resin in this mixture was about 55% of the weight of the monomer incorporated.

This material was pulverized and then molded for 10 minutes under 5000 pounds per square inch pressure at 125° C. to yield a sound, hard, rigid, white, translucent, glossy, homogeneous product with a flexural strength of 10,000 pounds per square inch and a modulus of elasticity in flexure of $6.4 \times 10^5$ pounds per square inch.

Example VII

Monomeric ethylene glycol bis (allyl carbonate) to which five percent its weight of benzoyl peroxide had been added, was thickened to double its original viscosity as described in Example I. 300 g. of this thickened monomer was mixed with 90 g. of magnesium carbonate pigment to give a thick paste. This, in turn, was mixed on small mill rolls with 210 g. of powdered alpha cellulose, Kingcote 6000. The mixture was heated in a thin layer under a $CO_2$ atmosphere in an oven at 70° C. for 1079 minutes to yield a tough, fibrous product which was 72.3% insoluble in acetone and which contained 1.2% of benzoyl peroxide or its oxidizing equivalent. Thus, the monomer had become 44.6% insoluble and contained 2.4% of peroxide. This product was ground to a fairly fine powder and molded at 125° C. for 10 minutes under 5000 pounds per square inch to give a sound, white, strong, translucent product with good surface finish.

Example VIII

A mixture of 75 parts by weight of benzoyl peroxide, 225 parts by weight of monomeric allyl methacrylate and 1275 parts by weight of acetone was refluxed at 63° C. for three hours. 2800 parts by weight of methyl alcohol was then added to the mixture. The resulting mixture was then poured, with stirring, into 10,000 parts by weight of a methyl alcohol water mixture containing 80 percent of methyl alcohol by volume. The precipitate thus formed was coagulated and recovered from solution.

The product was heated at 40° C. until a product containing 40 percent by weight of insoluble polymer was secured. This product was then molded as in Example I and a hard, translucent product was secured.

Although the present invention has been described with reference to specific details of certain embodiments thereof, it is not intended that such details shall be regarded as limitations upon the scope of the invention except insofar as included in the accompanying claims.

I claim:

1. A method of preparing a molded composition of ethylene glycol bis(allyl carbonate) which comprises partially polymerizing the compound in the presence of an organic peroxy compound to form a soft gel containing 40 to 80 percent of an acetone insoluble polymer, breaking the gel into discrete particles and molding under pressure and temperature controlled to knit the particles into a compact mass thereby polymerizing the mass into a hard infusible state.

2. A method of preparing a molded composition of a dialkenyl ester of a dicarboxylic acid wherein the alkenyl radicals have an olefinic linkage attached to the second carbon atom from the oxygen atom adjacent said alkenyl radical, which method comprises partially polymerizing the compound in the presence of an organic peroxy compound to form a soft gel containing 40 to 80 percent of an acetone insoluble polymer, breaking the gel into discrete particles and molding under pressure and temperature controlled to knit the particles into a compact mass thereby polymerizing the mass into a hard infusible state.

3. A method of preparing a molded composition of a dialkenyl ester of a dicarboxylic acid wherein the alkenyl radicals have a carbon-to-carbon unsaturated linkage attached to the second carbon atom from the oxygen atom adjacent said alkenyl radical, which method comprises heating said ester in the presence of an organic peroxy compound until a soft gel containing 40 to 80 percent of an acetone insoluble polymer and a substantial quantity of said organic peroxy compound, breaking the gel into discrete particles and molding the gel under conditions of pressure and temperature sufficient to cause a fusion to a homogeneous mass and peroxide catalyzed polymerization to a hard infusible resin.

4. The method of claim 2 in which the soft gel contains 50 to 75% acetone insoluble polymer.

5. The method of claim 2 in which the ester is a diallyl ester.

6. The method of claim 2 in which the ester is a dimethallyl ester.

IRVING E. MUSKAT.